United States Patent [19]

Kido

[11] Patent Number: 6,057,783
[45] Date of Patent: May 2, 2000

[54] MULTI-AREA RADIO PAGER WITH REPEATED RESYNCHRONIZATIONS INTERPOSED BY FREQUENCY SCANNING PROCESS

[75] Inventor: Toru Kido, Shizuoka, Japan

[73] Assignee: NEC Corporation, Tokyo, Japan

[21] Appl. No.: 09/048,862

[22] Filed: Mar. 26, 1998

[30] Foreign Application Priority Data

Mar. 26, 1997 [JP] Japan .................................... 9-074148

[51] Int. Cl.[7] .................................................. G08B 5/22
[52] U.S. Cl. ................................... 340/825.44; 455/38.1; 455/343; 379/57
[58] Field of Search .................. 340/875.44, 875.03, 340/875.48; 455/38.3, 161.3, 164.1, 343, 38.1, 38.5, 150.1, 161.1, 161.2; 379/57

[56] References Cited

U.S. PATENT DOCUMENTS

| 4,914,649 | 4/1990 | Schwendeman et al. ................. 370/50 |
| 5,532,683 | 7/1996 | Kondo ................................. 340/825.03 |

FOREIGN PATENT DOCUMENTS

| 0 632 599 A1 | 1/1995 | European Pat. Off. . |
| 0 822 725 A2 | 2/1998 | European Pat. Off. . |
| 55-147047 | 11/1980 | Japan . |
| 64-68036 | 3/1989 | Japan . |
| 6-315001 | 11/1994 | Japan . |
| 8-242145 | 9/1996 | Japan . |
| 10-210539 | 8/1998 | Japan . |
| 2 164 218 | 3/1986 | United Kingdom . |
| 90/16134 | 12/1990 | WIPO . |
| 94/14286 | 6/1994 | WIPO . |

*Primary Examiner*—Michael Horabik
*Assistant Examiner*—Anthony Asongwed
*Attorney, Agent, or Firm*—Scully, Scott, Murphy & Presser

[57] ABSTRACT

A multi-area pager includes a scan list table having multiple entries for storing data representing frequencies and area codes and an area information table for storing data representing a frequency and an area code associated with a received paging signal. When an out-of-range indication is given after synchronization sequences are not properly detected, the power-consuming receiver of the pager is briefly deactivated and then controlled according to the frequency data of the area information table to demodulate a paging signal. An area code of the signal is compared with that of the area information table if a synchronization sequence is detected. If that sequence is not detected or if the area codes do not match, the receiver is controlled according to the frequency data of a specified entry of the scan list table to demodulate a paging signal. Again, an area code of the signal is compared with that of the specified entry if a synchronization sequence is detected. If that sequence is not detected or if the area codes do not match again, a subsequent entry of the scan list table is specified, the receiver is again controlled, after a brief turn-off interval, according to the frequency data of the area information table. If there is a match between the area codes, the area information table is updated with the data of the specified entry.

12 Claims, 3 Drawing Sheets

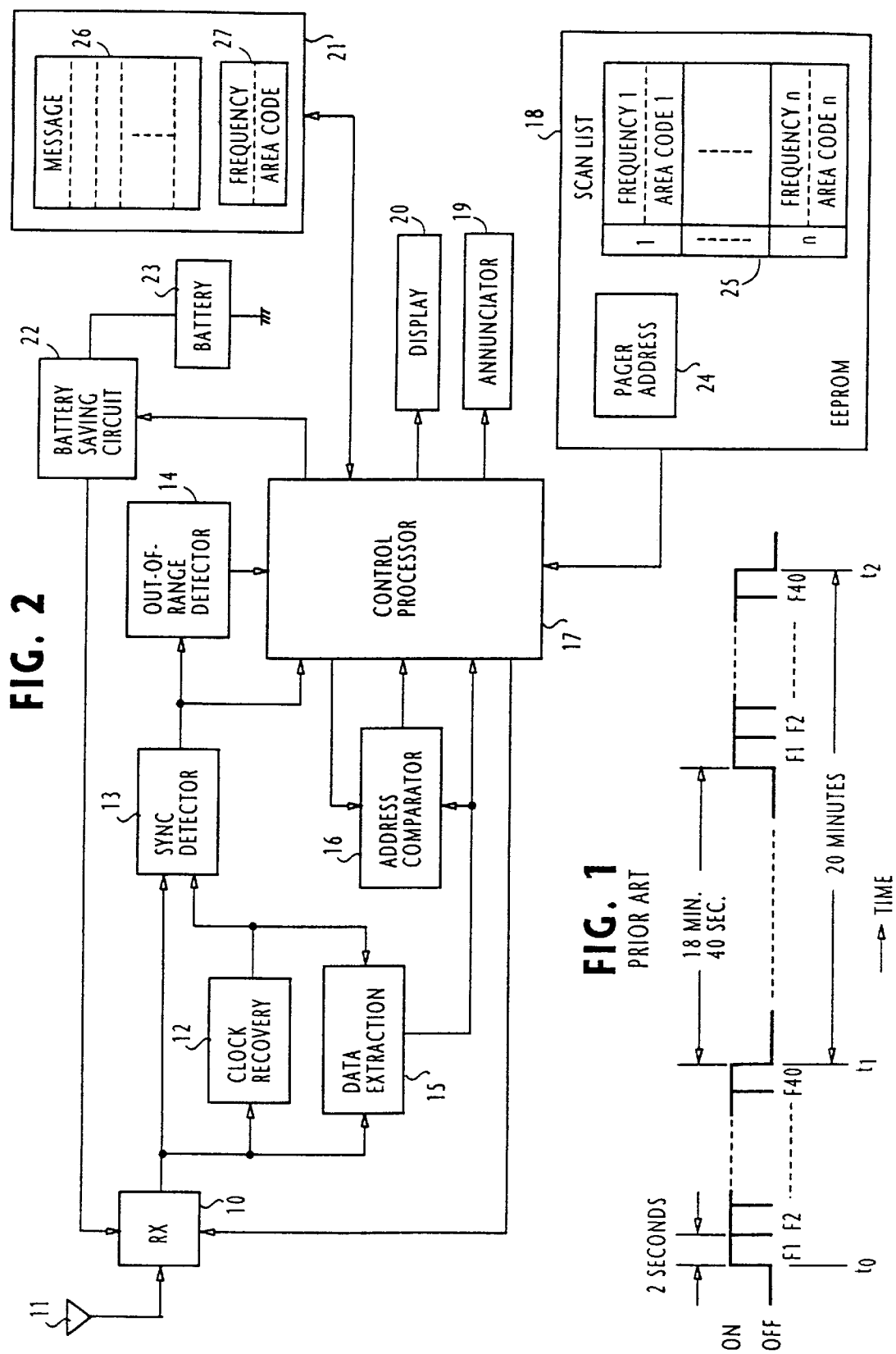

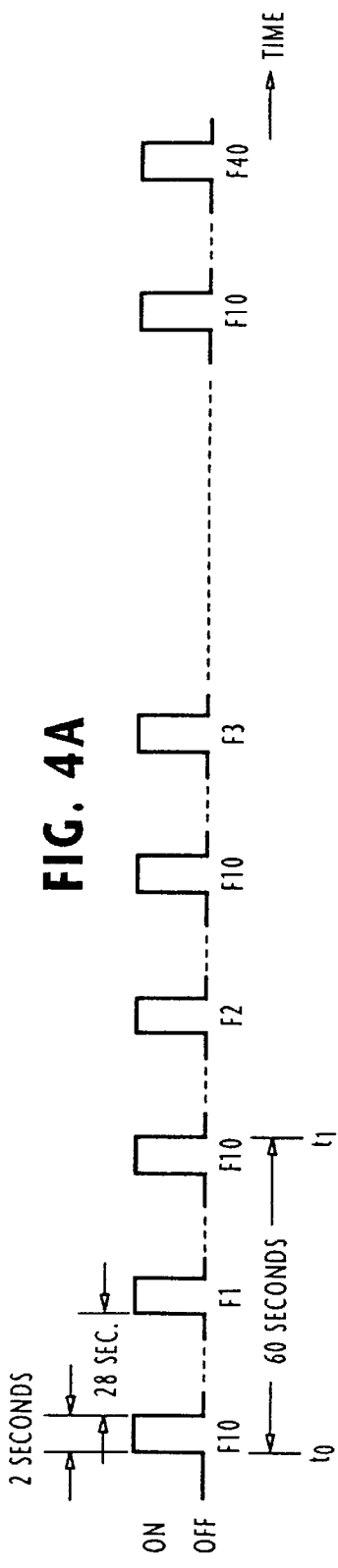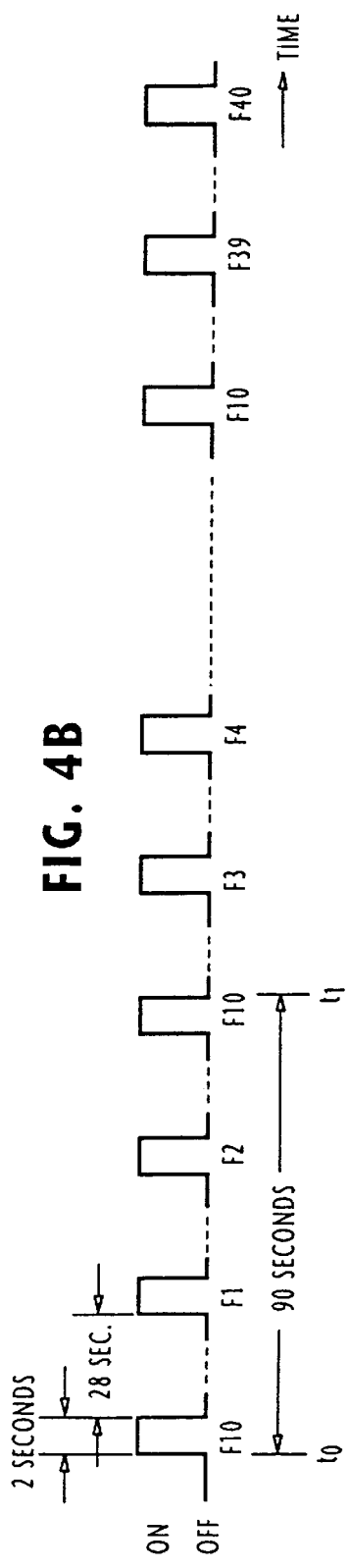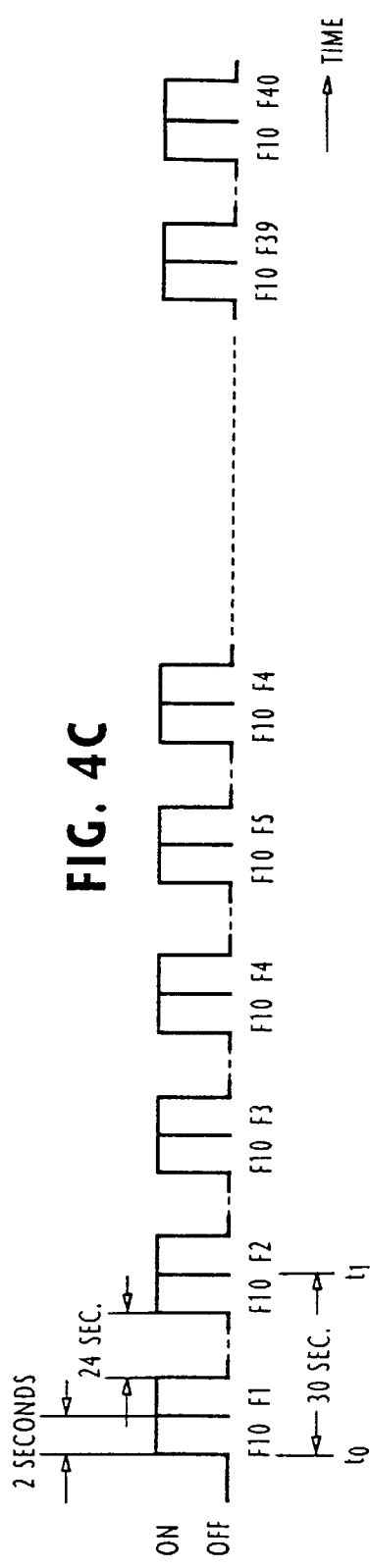

MULTI-AREA RADIO PAGER WITH REPEATED RESYNCHRONIZATIONS INTERPOSED BY FREQUENCY SCANNING PROCESS

BACKGROUND OF THE INVENTION

1. Field of the Invention

The present invention generally relates to radio pagers, and more specifically to a multi-area radio pager operating in a battery saving mode immediately after losing contact with a communicating channel due to hindrance by a building or an underground structure.

2. Description of the Related Art

Multi-area radio display pagers have been developed to enable users to be paged in a number of service areas in which different frequencies are used. Such radio pagers are provided with a scan list memory which contains data concerning assigned frequencies and unique codes of the areas in which the pagers are entitled to be serviced. The pager is programmed to constantly monitor a signal it is receiving. Once the current field strength drops below a defined threshold, it makes a search through the scan list in an attempt to select the frequency of a new area. If the cause of the low field strength is due to the fact that the pager has moved out of a service area, the attempt is to find a new channel, and if this is caused by hindrance of the signal path by an obstacle or underground structure, the attempt is to recapture the previous channel. Such multi-area pagers operate in a battery saving mode during standby periods.

Japanese Laid-Open Patent Specification Hei-6-315001 discloses a multi-area pager in which the energy-consuming receiver is periodically turned on for a brief interval to select a frequency according to the frequency data of in the pager's scan list. The receiver is then turned off if it fails to synchronize to the selected frequency or if it is successful in the attempt but fails to detect the pager's address in the synchronized signal. This process will be repeated until the pager's address is detected in a synchronized signal.

Since the ratio of the turn-on time to the turn-off time is a measure of the efficiency of the battery saving operation, a ratio of 1/15 is usually employed. Although satisfactory when the pager is entering a new area and making a search for a new frequency, the ratio of this value is unsatisfactory when the pager is making an attempt to resynchronize to the previous frequency after it suddenly lost contact with the transmitter. However, as the number of frequencies assigned to a paging system increases, the amount of time taken to complete a scan across the assigned frequencies during such resynchronization process becomes substantial.

As a result, a serious problem can occur in a multi-area radio pager when performing repeated resynchronization attempts after it briefly lost contact with the transmitter. If a system has 40 allocated frequencies and each pager takes 2 seconds to synchronize to each frequency during a search, the turn-on time to complete a search is 80 seconds and hence the turn-off time of the pager to achieve the saving ratio of 1/15 is equal to 18 minutes 40 seconds (=80×15−80) as shown in FIG. 1. Therefore, in a worst case a multi-area pager would start a search through the scan list from time $t_1$, and resynchronize to one of the allocated frequencies at time $t_2$, taking a maximum of 20 minutes.

SUMMARY OF THE INVENTION

It is therefore an object of the present invention to provide a simple and yet effective solution to the problem of resynchronization after a multi-area pager has suddenly lost contact with a current channel.

In order to achieve the object, the multi-area radio pager of the present invention comprises a receiver for demodulating a paging signal, a sync detector for detecting a synchronization sequence in the demodulated paging signal, a scan list table having a plurality of entries for storing data representing frequencies and area codes, an area information table for storing data representing a frequency and an area code associated with the paging signal, and an out-of-range detector for producing an out-of-range indication when synchronization sequences are not properly detected by the sync detector. In response to the out-of-range indication, the receiver is briefly deactivated and then controlled according to the frequency data of the area information table to demodulate a paging signal. An area code of the paging signal is compared with the area code of the area information table if a synchronization sequence is detected in the demodulated paging signal. If the synchronization sequence is not detected or if the area codes do not match, the receiver is controlled according to the frequency data of a specified entry of the scan list table to demodulate a paging signal. An area code of the paging signal is compared with the area code of the specified entry if a synchronization sequence is detected in the demodulated signal. If the synchronization sequence is not detected or if the area codes do not match again, a subsequent entry of the scan list table is specified, the receiver is briefly deactivated, and the receiver is again controlled according to the frequency data of the area information table. If the area codes match, the area information table is updated with the data of the specified entry.

BRIEF DESCRIPTION OF THE DRAWINGS

The present invention will be described in further detail with reference to the accompanying drawings, in which:

FIG. 1 is a timing diagram of the battery saving mode of a prior art multi-area radio display pager;

FIG. 2 is a block diagram of a multi-area radio display pager according to the present invention;

FIGS. 4A to 4C are timing diagrams of different battery saving modes according to the present invention.

DETAILED DESCRIPTION

Figure 3:
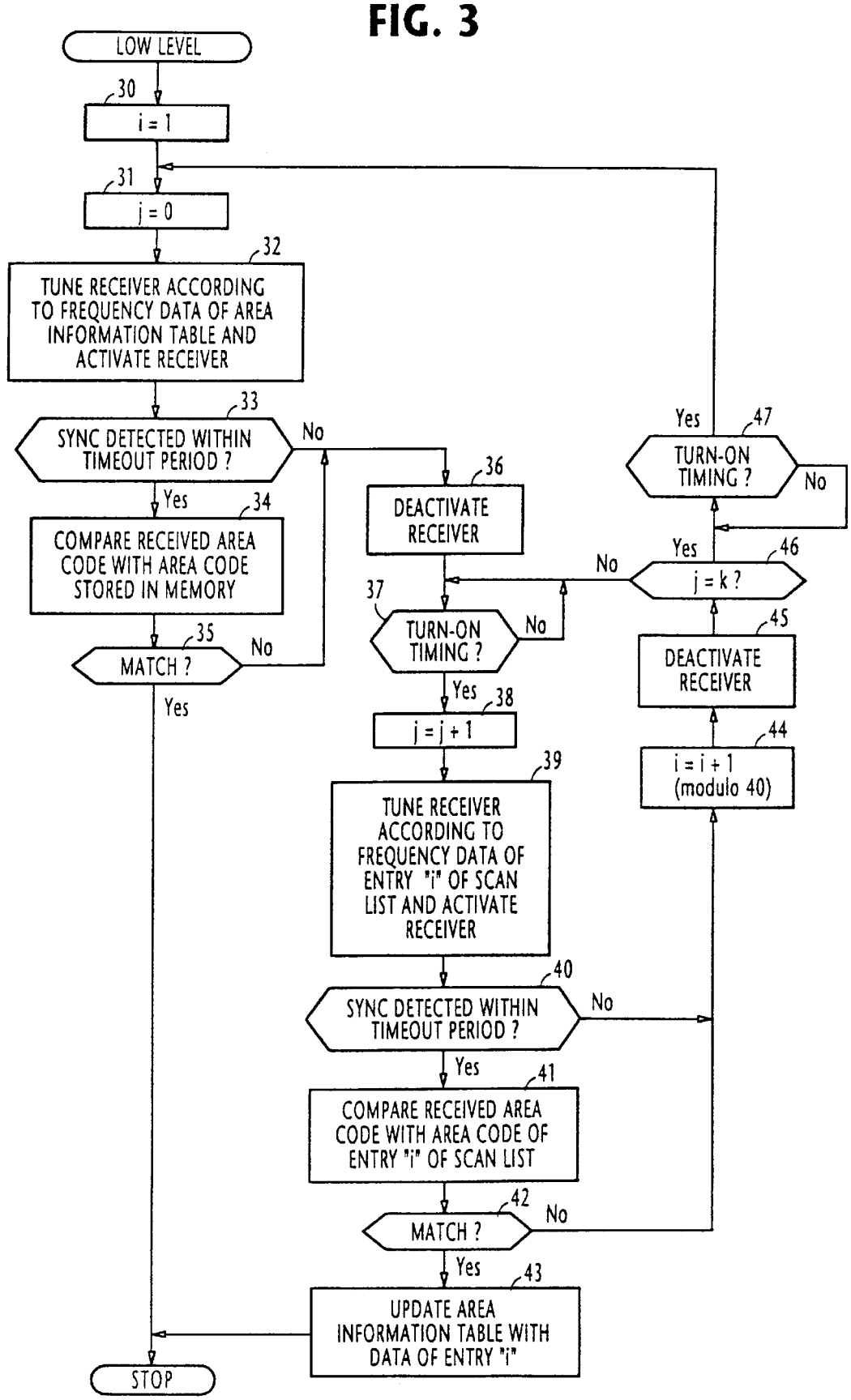
FIG. 3 is a flowchart of the operation of the pager of the present invention.

As shown in FIG. 2, a multi-area pager of the present invention comprises a power-consuming receiver 10 having an amplifier and demodulation stages for amplifying signals received at antenna 11 and detecting a baseband signal. Receiver 10 has a frequency synthesizer which is controlled by a control processor 17 for demodulation of signals of different frequencies. A clock recovery circuit 12 is connected to the receiver 10 to extract clock information from the baseband signal for bit synchronizing the pager to the transmitted digital sequence. A sync detector 13 utilizes the output of clock recovery circuit 12 to detect a synchronization sequence from the output of the receiver 10 and produce an output indicating whether or not a synchronization sequence is detected. The output signal of the sync detector 13 is counted by an out-of-range detector 14. If synchronization sequence is not properly detected, out-of-range detector 14 determines that the field strength of the pager is very low possibly due to the fact that the pager has moved out of a service area or reception is hindered by an obstacle and communicates this out-of-range condition to the control processor 17. Control processor 17 is also supplied with the output of sync detector 13 to determine whether or not synchronization is established with a received signal.

The recovered clock is also used by a data extraction circuit 15 to extract a data sequence from the output of the receiver 10. The extracted data sequence is applied to the control processor and an address comparator 16.

A nonvolatile memory 18, implemented by an EEPROM, is connected to the control processor 17. This memory has a storage location 24 in which the pager's address is stored and a scan list table 25 in which a plurality of entries are defined for storing the frequencies and area codes of the system. Control processor 17 reads the pager's address out of the location 24 into the address comparator 16 to check for coincidence with an address contained in the received data sequence. If they match, the address comparator 16 produces an output signal and the processor 17 activates the annunciator 19 to inform the owner of the pager of the arrival of a message and stores the message contained in the extracted data sequence into the message storage table 26 of a RAM 21 for later retrieval for display on the display panel 20. An area information read-write table 27 is defined in the RAM 21 to store data concerning the frequency and area code of the area in which the pager is currently located. A battery saving circuit 22 performs battery saving on the power supply line from the battery 23 to the energy-consuming part of receiver 10 in response to a control signal from control processor 17. When the out-of-range detector 14 produces an out-of-range indication, the control processor 17 supplies a saving command to battery saving circuit 22 to enter a battery saving mode by periodically interrupting the battery supply to the receiver 10.

The operation of control processor 16 is illustrated in the flowchart of FIG. 3 when out-of-range detector 14 senses that synchronization signals have not been properly detected for an predetermined interval.

In FIG. 3, when the out-of-range condition is detected, the control processor 16 initializes a scan variable "i" to 1 at step 30 and initializes a repeat variable "j" to 0 at step 31. The scan variable represents the serial number of each of the frequencies allocated to the system and assumes an integer in the range from 1 to 40, and the repeat variable represents the number of times the scan list 25 is looked up by the control processor 17 before it returns to step 31.

At step 32, the control processor reads stored data from the area information table 27 and tunes the frequency synthesizer of receiver 10 to the frequency specified by the retrieved frequency data and controls the battery saving circuit 22 to turn on the receiver 10 for a 2-second timeout period.

At step 33, the control processor 17 checks the output of sync detector 13 to see if synchronization is established with the paging signal within the 2-second timeout period. If so, flow proceeds from step 33 to step 34 to compare the area code of the received signal with the area code stored in the area information table 27. If they match (step 35), it is determined that the multi-area pager is succession in its attempt to recapture the previous channel and flow proceeds to the end of the routine. The battery saving mode is therefore discontinued to store a message contained in the received signal into the message table 26.

If the receiver either fails to resynchronize to the received signal (step 33) or fails to detect a match between the area codes (step 35), flow proceeds to step 36 to deactivate the receiver 10 by controlling the battery saving circuit 22 to enter a battery turn-off cycle. When the period of this battery saving expires (step 37), the scan repeat variable "j" is incremented by 1 at step 38. At step 39, the data stored in the entry "i" of the scan list table 25 is read and the receiver's frequency synthesizer is tuned to the frequency specified by the retrieved frequency data. The battery saving circuit 22 is controlled to reactivate the receiver 10 to receive a transmitted signal.

At step 40, the control processor 17 checks the output of sync detector 13 to see if a synchronization is detected in the received signal within the 2-second timeout period. If so, flow proceeds from step 40 to step 41 to compare the area code of the received signal with the area code stored in the entry "i" of scan list 25. If they match (step 42), it is determined that the multi-area pager is successes in its attempt to capture a new channel and flow proceeds to step 43 to update the area information table 27 with the frequency and area code of entry "i" before the routine is terminated. Therefore, the battery saving mode is discontinued to read a message contained in the received signal into the message table 26.

If the receiver either fails to detect a synchronization sequence at step 40 or fails to detect a matching area code at step 42, flow proceeds to step 44 to increment the modulo-40 of scan variable "i" by 1 and, at step 45 the battery saving circuit 22 is controlled to deactivate the receiver so that the pager enters a battery turn-off cycle again.

At step 46, the control processor checks to see if the repeat variable "j" is equal to a preselected integer "k". If j is not equal to k, flow returns to step 37 to repeat the scan process on the entry "i+1" of the scan list. If j equals k, flow branches at step 46 to step 47 to determine if the battery turn-off cycle has expired. Thus, at the end of the battery turn-off cycle flow exists step 47 and returns to step 31 to repeat the routine to make a further attempt to resynchronize to the previous frequency.

If k is set equal to 0, the frequency scan is performed once between successive attempts of resynchronization to the previous frequency. Assume that the pager has previously tuned to frequency F10 and the battery saving cycle between steps 36 and 37 lasts for a duration of 28 seconds and the same interval exists between steps 45 and 47. Frequency F10 is first tested for synchronization at step 33 at time $t_0$ as shown in FIG. 4A and if the resynchronization attempt fails, step 41 will be executed to test frequency F1, 28 seconds after the first attempt. If this second test fails, the previous frequency F10 will be tested again at time $t_1$ which is 60 seconds after time $t_0$.

If k is set equal to 1, the frequency scan will be performed twice between successive attempts of resynchronization to the previous frequency. Using the same assumption, frequency F10 is first tested at step 33 at time $t_0$ as shown in FIG. 4B and if the resynchronization attempt fails, step 41 will be executed to test frequency F1, 28 seconds after the first attempt and executed again to test frequency F2, 28 seconds after the second attempt. If this third test fails, the previous frequency F10 will be tested again at time $t_1$ which is 90 seconds after time $t_0$.

Assume that k is set equal to 0 and that steps 36 and 37 are dispensed with so that no battery saving cycle is provided between the first and second attempts and that the battery saving cycle between steps 45 and 47 lasts for a duration of 24 seconds. In this case, frequency F10 is first tested for synchronization at step 33 at time to as shown in FIG. 4C. If the resynchronization attempt fails, step 41 will be executed to test frequency F1 immediately after the first attempt. If this second test fails, the previous frequency F10 will be tested again at time $t_1$ which is 30 seconds after time $t_0$.

It is seen that the multi-area pager of this invention has an increased probability of receiving the signal which was used at the time the pager encountered a sudden loss of contact with the transmitter.

What is claimed is:

1. A method for operating a multi-area radio pager, wherein the pager comprises a receiver for demodulating a paging signal, a sync detector for detecting a synchronization sequence in the demodulated paging signal, a scan list table having a plurality of entries for storing data representing frequencies and area codes, an area information table for storing data representing a frequency and an area code associated with the paging signal, and an out-of-range detector for producing an out-of-range indication when synchronization sequences are not properly detected by the sync detector, the method comprising the steps of:
   a) briefly deactivating the receiver in response to the out-of-range indication;
   b) controlling the receiver according to the frequency data of the area information table to demodulate a paging signal, determining whether a synchronization sequence is detected in the demodulated paging signal, and comparing an area code of the paging signal with the area code of the area information table if the synchronization sequence is detected;
   c) if the synchronization sequence is not detected or if the area codes do not match, controlling the receiver according to the frequency data of a specified entry of the scan list table to demodulate a paging signal, determining whether a synchronization sequence is detected in the demodulated paging signal, and comparing an area code of the paging signal with the area code of the specified entry if the synchronization sequence is detected;
   d) if the synchronization sequence is not detected or if the area codes do not match, specifying a subsequent entry of the scan list table, briefly deactivating the receiver, and repeating the steps (b) to (d); and
   e) if the area codes match, updating the area information table with the data of said specified entry.

2. The method of claim 1, wherein the step (c) further comprises briefly deactivating the receiver before the receiver is controlled according to the frequency data of the specified entry of the scan list table.

3. The method of claim 1, wherein the step (e) further comprises repeating the steps (c) and (d) before repeating the steps (b) to (d).

4. The method of claim 3, wherein the steps (c) and (d) are repeated multiple times before the steps (b) to (d) are repeated.

5. The method of claim 2, wherein the step (e) further comprises repeating the steps (c) and (d) before repeating the steps (b) to (d).

6. The method of claim 5, wherein the steps (c) and (d) are repeated multiple times before the steps (b) to (d) are repeated.

7. A multi-area radio pager comprising:

a receiver for demodulating a paging signal;

a sync detector for detecting a synchronization sequence in the demodulated paging signal;

a scan list table having a plurality of entries for storing data representing frequencies and area codes;

an area information table for storing data representing a frequency and an area code associated with the paging signal;

an out-of-range detector for producing an out-of-range indication when synchronization sequences are not properly detected by the sync detector; and a control processor programmed to perform the functions of:
   a) briefly deactivating the receiver in response to the out-of-range indication;
   b) controlling the receiver according to the frequency data of the area information table to demodulate a paging signal, determining whether a synchronization sequence is detected in the demodulated paging signal, and comparing an area code of the paging signal with the area code of the area information table if the synchronization sequence is detected;
   c) if the synchronization sequence is not detected or if the area codes do not match, controlling the receiver according to the frequency data of a specified entry of the scan list table to demodulate a paging signal, determining whether a synchronization sequence is detected in the demodulated paging signal, and compare an area code of the paging signal with the area code of the specified entry if the synchronization sequence is detected;
   d) if the synchronization sequence is not detected or if the area codes do not match, specifying a subsequent entry of the scan list table, briefly deactivating the receiver, and performing the functions (b) to (d); and
   e) if the area codes match, updating the area information table with the data of said specified entry.

8. A multi-area radio pager as claimed in claim 5, wherein the function (c) further comprises briefly deactivating the receiver before the receiver is controlled according to the frequency data of the specified entry of the scan list table.

9. A multi-area radio pager as claimed in claim 5, wherein the function (e) further comprises repeating the functions (c) and (d) before repeating the functions (b) to (d).

10. A multi-area radio pager as claimed in claim 9, wherein the functions (c) and (d) are repeated multiple times before the functions (b) to (d) are repeated.

11. A multi-area radio pager as claimed in claim 8, wherein the function (e) further comprises repeating the functions (c) and (d) before repeating the functions (b) to (d).

12. A multi-area radio pager as claimed in claim 11, wherein the functions (c) and (d) are repeated multiple times before the functions (b) to (d) are repeated.

* * * * *